ELEVATOR CONTROL SYSTEM TESTING APPARATUS

Filed Nov. 16, 1954

STEPHEN ANTHONY HORNUNG INVENTOR

BY Leon H. Emrick ATTORNEY

United States Patent Office 2,734,598

Patented Feb. 14, 1956

2,734,598

ELEVATOR CONTROL SYSTEM TESTING APPARATUS

Stephen Anthony Hornung, New York, N. Y., assignor to Otis Elevator Company, New York, N. Y., a corporation of New Jersey Application November 16, 1954, Serial No. 469,087

5 Claims. (Cl. 187—29)

Figures 1, 1A:
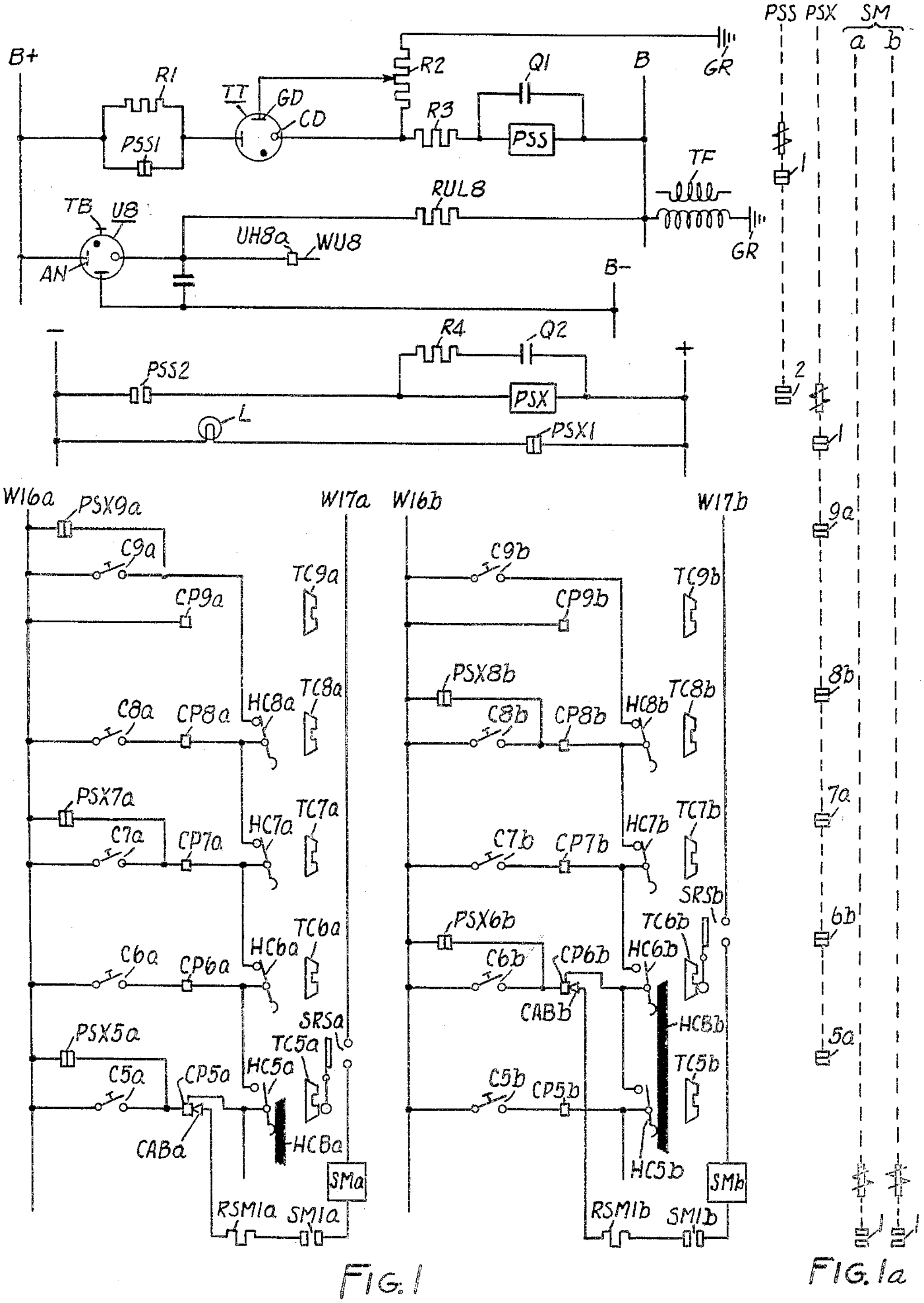

The invention relates to testing apparatus, especially for call registering circuits of elevator control systems.

There are many elevator installations in which the calls for setting up stops at landings are registered on gaseous electronic tubes. Such arrangement is disclosed for example in the patent to Glaser and Hornung, 2,589,242. In that arrangement, a source of direct current is provided for the anode-cathode circuits of the tubes and a source of periodic current is provided for the firing circuits of the tubes. The firing circuit is completed by touch on the part of the person registering the call, causing the tube to become conductive. The direct current source thereafter maintains the conduction of the tube and thus the call in registration after touch is discontinued until the call is answered, whereupon it is automatically cancelled.

It is important, especially in the case of intensive service elevator installations operating without attendants, such as disclosed in the aforesaid Glaser and Hornung patent, that provision be made to provide service, at least at certain selected landings, should there be failure of the call registering circuits. While with electronic tube call registering circuits, due to lack of moving parts, low currents and self fusing action of the tubes, there is little chance of blowing a fuse in the supply circuits, failure of either the direct current source voltage or periodic current source voltage may occur for some other reason.

It is the object of the invention to provide, for an elevator control system in which calls are registered on electronic gaseous tubes, an arrangement for testing the voltages of the direct current source and the periodic current source which is simple and reliable in operation and which acts to set up regular stops at certain selected landings in case of insufficient voltage of either source.

In carrying out the invention according to the preferred arrangement, a testing gaseous electronic tube having characteristics comparable to those of the call registering tubes is provided with its anode-cathode circuit connected to the direct current source and its firing circuit connected to the periodic current source. The anode-cathode circuit of this tube is alternately completed and opened at successive intervals. Should the tube fail to refire at any time due to insufficient voltage of either the direct current source or the periodic current source, switching mechanism is rendered effective to set up regular stops at landings.

In the drawings:

Figure 1 is a schematic representation of circuits embodying the invention; and

Figure 1*a* is a spindle diagram for locating the coils and contacts of the electromagnetic switches of Figure 1.

Referring to the drawings, for purposes of simplification and by way of example, the invention is illustrated as applied to the call registering circuits of the aforesaid Glaser and Hornung Patent No. 2,589,242. But one landing call registering circuit is shown, namely, that for registering an up landing call for the eighth floor, the designating characters being the same as in the patent. The circuits for setting up regular stops at landings in case of insufficient voltage of the call registering circuits are illustrated as applied to the car call circuits for floors five to nine of the aforesaid Glaser and Hornung patent. For convenience, these circuits for floors below the fifth are not shown, but it is to be understood that the circuits would be applied to the car call circuits for those floors as well. These circuits are shown for cars "*a*" and "*b*," the designating characters being the same as in the patent. Electromagnetic switches employed other than those of the aforesaid Glaser and Hornung patent are as follows:

PSS Power supply test relay
PSX Power supply test switch

TT is an electronic gaseous tube utilized in the testing circuits. Resistors are designated generally as R and condensers as Q. Resistors R3 and R4 are timing resistors and condensers Q1 and Q2 are timing condensers. Resistor R1 is a surge suppressor and resistor R2 is a sensitivity control.

Each of the landing call registering tubes of which U8 is representative has a fixed button TB connected to the tube envelope, with the circuits arranged so that the tube breaks down in response to manual touch of the fixed button and remains conductive, thereby registering the call and enabling the touch to be discontinued. These electronic tubes are cold cathode gas tubes, the type having a wire anode extending to within a short distance of the glass envelope of the tube, such as the RCA 1C21, having been found satisfactory. With such a tube, the fixed button is connected to the tube envelope adjacent to the anode. For such tubes, the preferred voltage values are 150 volts from line B+ to line B, 30 volts from line B to line B−, and 150 volts R. M. S. from line B to the grounded end of the secondary of transformer TF. The 150 volts direct current applied to the anode-cathode circuit of the tube is not sufficient to cause conduction. However, upon an intending passenger touching the fixed button, a circuit is established from ground GR through the secondary of transformer TF to line B which is connected through line B+ to the anode AN of the tube and thence from the tube envelope through the body of the intending passenger back to ground. As a result, sufficient alternating current voltage is applied between the anode and tube envelope to break down the tube.

The testing tube TT is of the same type as the call registering tubes except that the fixed button is not provided. The anode-cathode circuit of this tube is connected across the direct current source B+, B while alternating current voltage for the firing circuit is provided by the secondary of transformer TF. The firing circuit for tube TT extends from the left hand side of the secondary of transformer TF to line B which is connected to the cathode CD from which it extends to the control electrode GD and thence by way of resistor R2 and ground GR to the right hand side of the secondary of transformer TF, the control electrode being nearer the cathode than the anode. The proper value of firing voltage is obtained by adjustment of resistor R2.

Relay PSS has its operating coil in the anode-cathode circuit of tube TT. It has contacts PSS1 controlling this anode-cathode circuit and also contacts PSS2 which control the circuit for the coil of switch PSX. Switch PSX has contacts which are effective when the switch is dropped out to set up regular stops at the landings.

In operation, with contacts PSS1 closed, the anode-cathode circuit of tube TT is completed and, as the firing circuit is also completed, the tube becomes conductive.

This causes operation of relay PSS, the operation being delayed slightly by the action of resistor R3 to provide time to insure sufficient charging of condenser Q1 connected across the coil of relay PSS. Relay PSS, upon operation, separates contacts PSS1, inserting resistor R1 in the anode-cathode circuit. This resistor is of high enough value to reduce the current in the circuit to below tube conduction value and the tube goes out. This causes the dropping out of relay PSS, this action being delayed by the discharge of condenser Q1. Upon the relay dropping out, contacts PSS1 reengage to short circuit resistor R1 and the tube again becomes conductive. This action is repeated so long as the voltages of the direct current source B+, B and the alternating current source, secondary of transformer TF, are of proper value. The arrangement is such that there is not an excessive number of operations, say one every four or five seconds, and that the tube is conductive only a fraction, say one-tenth, of the time that it is non-conductive, with corresponding operation of the relay.

If for any reason, the voltage of either the direct current source or the alternating current source should fall below operating value, which would prevent registration of landing calls, tube TT will fail to fire upon the reengagement of contacts PSS1. As a result relay PSS does not reoperate. When relay PSS is operated, its contacts PSS2 complete the circuit for the coil of switch PSX, causing the switch to be operated, and when relay PSS drops out, its contacts PSS2 disconnect the coil of switch PSX from its supply lines. A condenser Q2 is connected across the coil so as to delay the dropping out of switch PSX for a sufficient time to enable the circuit to be reestablished by contacts PSS2 so long as the repeated operations of relay PSS continue. However, upon failure of relay PSS to reoperate, switch PSX drops out to set up regular stops at selected landings.

In the circuits illustrated, regular stops are set up for floors five, seven and nine for car "*a*" and for floors six and eight for car "*b*," this being effected through contacts PSX5*a*, PSX7*a*, PSX9*a*, PSX6*b* and PSX8*b* respectively. Contacts PSX7*a*, for example, set up a regular stop for car "*a*" at the seventh floor by by-passing car button C7*a*, connecting the car call pick-up contact CP7*a* on the selector directly to line W16*a*. Thus, upon brush CAB*a* engaging contact CP7*a* as car "*a*" approaches the seventh floor, a circuit is completed through now closed contacts SM1*a* for reset coil SM*a* upon closure of switch SRS*a* by cam TC7*a*, causing the car to be brought to a stop at the seventh floor as explained in the aforementioned Glaser and Hornung patent. Contacts PSX9*a* do not connect contacts CP9*a* to line W16*a* as this connection is permanently made. However, they by-pass car button C9*a*, acting through the circuit through hook switches HC*a* to insure the car traveling to the top floor.

Upon restoration of the voltages for the call registering circuits to proper voltage values, relay PSS reoperates to reestablish the testing cycle. As a result, switch PSX reoperates to discontinue the regular stops at the selected floors. Switch PSX is provided with additional contacts PSX1 which act, when the call registering circuits are ineffective, to complete a circuit for a signal, illustrated as lamp L, to indicate say to the building superintendent that such condition exists so that it may be promptly corrected.

The surge suppressor resistor R1 acts to prevent refiring of tube TT upon reengagement of contacts PSS1 by a surge of current in the anode-cathode circuit under conditions where the voltage of the firing circuit is below proper value, as for example where the secondary of transformer TF is disconnected from ground GR. It may be possible in certain instances to omit this resistor, but it is preferred to include it.

As changes could be made in the above arrangement without departing from the scope of the invention, it is intended that all matter contained in the above description or shown in the accompanying drawings shall be interpreted as illustrative and not in a limiting sense.

What is claimed is:

1. In an elevator system in which calls for each of a plurality of landings are registered on gaseous electronic tubes to set up stops for the landings, each of said tubes having an anode-cathode circuit and a firing circuit, and in which a source of direct current is provided for the anode-cathode circuits and a source of periodic current is provided for the firing circuits, characterized in that there are provided means for testing the voltage of said direct current source and said periodic current source comprising a testing gaseous electronic tube having an anode-cathode circuit and a firing circuit, having characteristics comparable to those of the call registering tubes, and having its anode-cathode circuit connected to said direct current source and its firing circuit connected to said periodic current source, means controlled by said testing tube for repeatedly alternately firing and extinguishing the tube, and means responsive to said first named means upon failure of said testing tube to refire due to insufficient voltage of either said direct current source or said periodic current source to set up regular stops at certain of said landings.

2. In an elevator system in which calls for each of a plurality of landings are registered on cold cathode gas tubes to set up stops for the landings, each of said tubes having an anode-cathode circuit and a firing circuit, and in which a source of direct current is provided for the anode-cathode circuits and a source of periodic current is provided for the firing circuits, characterized in that there are provided means for testing the voltage of said direct current source and said periodic current source comprising a testing cold cathode gas tube having an anode-cathode circuit and a firing circuit, having characteristics comparable to those of the call registering tubes, and having its anode-cathode circuit supplied from said direct current source and its firing circuit supplied from said periodic current source, means controlled by conduction of said testing tube to extinguish that tube upon each firing thereof and to render that tube conductive upon each extinguishing thereof to cause the tube to be repeatedly fired and extinguished so long as there exists the proper voltages of said direct current source and said periodic current source, and means responsive to said first named means upon failure of said testing tube to refire due to insufficient voltage of either said direct current source or said periodic current source to set up regular stops at certain of said landings.

3. In an elevator system in which calls for each of a plurality of landings are registered on cold cathode gas tubes to set up stops for the landings, each of said tubes having an anode-cathode circuit and a firing circuit, and in which a source of direct current is provided for the anode-cathode circuits and a source of alternating current is provided for the firing circuits, characterized in that there are provided means for testing the voltage of said direct current source and said alternating current source comprising a testing cold cathode gas tube having an anode-cathode circuit and a firing circuit, having characteristics comparable to those of the call registering tubes, and having its anode-cathode circuit supplied from said direct current source and its firing circuit supplied from said alternating current source, a relay responsive to the firing of said testing tube to cause extinguishing of that tube and operable thereafter to cause the tube to refire so as to cause the tube to be repeatedly fired and extinguished so long as there exists the proper voltages of said direct current source and said alternating current source, and a second relay controlled by said first relay operable upon failure of said testing tube to refire within a certain time interval after operation of said first relay to initiate such refiring due to insufficient voltage of either said direct current source or said alternating current source to set up regular stops at certain of said landings and to cause at least one car to travel to the top terminal landing.

4. In an elevator system in which landing calls for each of a plurality of landings are registered on cold cathode gas tubes to set up stops for the landings, each of said tubes having an anode-cathode circuit and a firing circuit, and in which a source of direct current is provided for the anode-cathode circuits and a source of alternating current is provided for the firing circuits, characterized in that there are provided means for testing the voltage of said direct current source and said alternating current source comprising a testing cold cathode gas tube having an anode-cathode circuit and a firing circuit, having characteristics comparable to those of the call registering tubes and having its anode-cathode circuit connected across said direct current source and its firing circuit connected across said alternating current source, a relay responsive to firing of said testing tube to reduce the current in said anode-cathode circuit of said testing tube to below conduction value and being operable after such current reduction to restore the current to above conduction value so as to cause the testing tube to be repeatedly fired and extinguished, and a second relay having an operating circuit adapted to be completed by the first named relay when operated and broken when said first named relay is dropped out, said second relay having a delayed action for preventing when its operating circuit is broken its dropping out upon reoperation of said first relay within a certain time interval and having means actuatable, when said second relay is dropped out as a result of the failure of said testing tube to refire upon restoration of the current in its anode-cathode circuit to above conduction value and thus the failure of said first relay to reoperate within said interval, to set up regular stops at certain of said landings.

5. In an elevator system in which up landing calls and down landing calls for each of a plurality of landings are registered on cold cathode gas tubes to set up stops for the landings, each of said tubes having an anode-cathode circuit and a firing circuit, and in which a source of direct current is provided for the anode-cathode circuits and a source of alternating current is provided for the firing circuits, characterized in that there are provided means for testing the voltage of said direct current source and said alternating current source comprising a testing cold cathode gas tube having an anode, a cathode and a control electrode, having characteristics comparable to those of the call registering tubes, and having its anode and cathode connected across said direct current source and its control electrode and cathode across said alternating current source, a resistance in the anode-cathode circuit of said testing tube of an ohmic value sufficient to reduce the current in that circuit to below conduction value, a relay response to firing of said testing tube to insert said resistance in said anode-cathode circuit of said testing tube and responsive to said breaking of said anode-cathode circuit of said testing tube to short-circuit that resistance so as to cause repeated firing and extinguishing of said testing tube, said relay having means for delaying the short-circuiting of said resistance to cause the tube to be extinguished for a longer period than it is fired, and a second relay having an operating circuit adapted to be completed by the first named relay when it is operated and broken by said first named relay when it is dropped out, said second relay having means for delaying its dropping out when its operating circuit is broken and having means operable when dropped out to set up regular stops at certain selected landings, whereby upon failure of said testing tube to refire upon short circuiting of said resistance by said first relay due to insufficient voltage from said direct current source or from said alternating current source, said regular stops are set up at said certain selected landings.

No references cited.